United States Patent
Otterbeck et al.

(10) Patent No.: US 7,123,906 B1
(45) Date of Patent: Oct. 17, 2006

(54) INTEGRATED TELEPHONY SERVICE

(75) Inventors: James A. Otterbeck, Lake Forest, IL (US); Julia Skladman, Northbrook, IL (US); Chad J. McCauley, Ingleside, IL (US); Michael Bendoff, Northbrook, IL (US)

(73) Assignee: Verizon Communications Inc., New York, NY (US)

( * ) Notice: Subject to any disclaimer, the term of this patent is extended or adjusted under 35 U.S.C. 154(b) by 197 days.

(21) Appl. No.: 10/688,370

(22) Filed: Oct. 17, 2003

(51) Int. Cl.
*H04Q 7/20* (2006.01)
*H04M 1/00* (2006.01)
*H04M 3/42* (2006.01)
*H04L 12/26* (2006.01)

(52) U.S. Cl. ............ 455/422.1; 455/557; 455/426.1; 370/352; 379/211.01

(58) Field of Classification Search ............ 455/422.1, 455/451, 426.1, 425, 507, 557, 417, 557.1, 455/74.1, 423, 552.1; 370/260, 352; 379/211.01
See application file for complete search history.

(56) References Cited

U.S. PATENT DOCUMENTS

| | | | | |
|---|---|---|---|---|
| 4,991,197 A | * | 2/1991 | Morris | 455/557 |
| 5,309,502 A | * | 5/1994 | Hirai | 455/426.1 |
| 5,353,331 A | * | 10/1994 | Emery et al. | 455/461 |
| 5,526,403 A | * | 6/1996 | Tam | 455/426.1 |
| 5,594,782 A | | 1/1997 | Zicker et al. | 379/63 |
| 5,675,629 A | * | 10/1997 | Raffel et al. | 455/552.1 |
| 6,044,267 A | * | 3/2000 | Foladare et al. | 455/426.1 |
| 6,078,821 A | * | 6/2000 | Kaschke et al. | 455/507 |
| 6,169,895 B1 | * | 1/2001 | Buhrmann et al. | 455/423 |
| 6,496,694 B1 | * | 12/2002 | Menon et al. | 455/426.2 |
| RE38,127 E | * | 5/2003 | O'Sullivan | 455/557 |
| 6,735,432 B1 | * | 5/2004 | Jarett et al. | 455/417 |
| 6,804,343 B1 | * | 10/2004 | Hafez | 379/211.01 |
| 2002/0181442 A1 | * | 12/2002 | Rajani | 370/352 |
| 2004/0008636 A1 | * | 1/2004 | Alexis | 370/260 |
| 2004/0072544 A1 | * | 4/2004 | Alexis | 455/74.1 |

* cited by examiner

Primary Examiner—George Eng
Assistant Examiner—Kiet Doan (57) ABSTRACT

An integrated telephony service can provide users with a single phone number and a single handset for use as a cordless device at a stationary location and for use as a mobile device. Incoming calls can be routed to the handset at the stationary location over a landline network. If unanswered at the stationary location, the calls can be routed to the handset via a service delivery point of presence over a wireless network. For outgoing calls from the handset, a switch within the handset can select cordless device operation when the handset is within range of a landline base station unit connected to the landline network and the handset can function as a cordless device in cooperation with the landline base station. If the handset is not within range of the landline base station, the switch can select mobile device operation and the call can be placed over the wireless network with the handset functioning as a mobile device.

28 Claims, 4 Drawing Sheets

INTEGRATED TELEPHONY SERVICE

FIELD OF THE INVENTION

The systems and methods relate to telephone services and more particularly to a single number phone service with a device capable of both landline and mobile communications.

BACKGROUND

The increase in cellular phones has resulted in phone system users having multiple phone numbers. For example, a user can have phone numbers associated with landlines for personal use and business use, and phone numbers associated with multiple mobile phones. In addition to requiring multiple entries in a contact folder or phone directory for the user, or requiring one to remember numerous numbers, those trying to contact the user may have to call each phone number to complete a call to the user.

Further, when a user changes residence, a new phone number can be assigned. The previous phone number can no longer be in service, which can result in lost contacts or calls until such time as others update the user's contact information. Some phone systems can have a call forwarding feature, such that phone calls to one number can be forwarded to another. For example, when a user is away from home, the user can program the system to forward incoming landline calls to the user's cellular phone number. However, calls will continue to be forwarded until such time as the call forwarding is disabled. Conversely, calls will not be forwarded unless the user remembers to initiate call forwarding. By relying on the user's memory to initiate or disable the call forwarding service, these services can provide less than optimal results.

SUMMARY

The systems and methods described herein can enable delivery of an integrated telephony service that can provide users with a single phone number and a single handset for use at a stationary location, such as a home or office, and also for use while away from the stationary location. The users can have one number for their landline communications to/from the stationary location and for their mobile communications. The systems and methods can also provide for a single voice mailbox for the users' messages through a messaging server. By integrating landline and cellular calls through a single handset, billing for the service can be simplified, allowing the user to receive a single bill for the integrated service.

The disclosed systems and methods can integrate landline and wireless communications such that the single handset can operate as a cordless device in connection with a landline network and can operate as a mobile device in connection with a wireless network. Incoming calls on the landline network can be routed to the handset through a landline base station connected to the landline network and in short range cordless communication with the handset. If an incoming call on the landline network is unanswered, the call can be routed to the handset over the wireless network.

For outgoing calls from the handset, a switch within the handset can select cordless device operation when the handset is within range of the landline base station. The handset can operate as a cordless device in cooperation with the landline base station. If the handset is not within range of the landline base station, the switch can select mobile device operation and the call can be placed over the wireless network.

In one embodiment, a system for integrating landline and wireless communications networks can include a hybrid device for enabling telephony communications, a landline connection path between the landline communications network and the hybrid device, a wireless connection path between the wireless communications network and the hybrid device, a switch to select one of the landline connection path and the wireless connection path for operation of the hybrid device, and a transfer device to transfer telephony communications enabled by the hybrid device from the landline communications network to the wireless communications network when the switch selects the wireless connection path.

The hybrid device can include a handset, a landline base station connected in the landline connection path between the landline communications network and the handset, a cordless connection microprocessor unit connected in the landline connection path between the landline base station and the handset, and a wireless microprocessor unit connected in the wireless connection path between the handset and the wireless communications network. The landline base station can include a charging station for charging a power source for the handset.

The handset can include a speaker, a display, a keypad, a microphone, a GPS tracking module and a web browser. The handset can also include a pager. The transfer device can include a messaging center, a media server, a routing platform and an administrative module. The landline connection path can be integrated with an Internet call managing service and the switch can be activated by a user of the Internet call managing service.

In one embodiment, a hybrid device for integrating landline and wireless communications can include a handset, a landline microprocessor unit selectively connected between the handset and a landline network, a wireless microprocessor unit selectively connected between the handset and a wireless network and a switching module to selectively activate one of the landline microprocessor unit and the wireless microprocessor unit. The hybrid device can include a landline base station connected between the landline network and the landline microprocessor unit. The landline base station can facilitate cordless communications between the landline network and the landline microprocessor unit. The landline base station can include a charging station for the handset. The handset can include a speaker, a display, a keypad, a microphone, a GPS tracking module and a web browser. The handset can also include a pager.

In one embodiment, a method of integrating landline and wireless communications can include receiving an incoming call from a landline network, determining if a connection is available between the landline network and a user device, routing the call from the landline network to a wireless network when the connection between the landline network and the user device is not available and when the user does not answer the call, and transmitting the call to the user device from the wireless network. The method can include initiating an outgoing call from the user device, determining if the connection is available between the landline network and the user device, routing the outgoing call from the user device to the landline network when the connection is available and routing the outgoing call from the user device to the wireless network when the connection between the landline network and the user device is not available.

When receiving an incoming call, the method can provide notifications of the incoming call at a landline base station connected to the landline network and can proceed to determining if the connection is available when a number of notifications exceeds a predetermined threshold. When determining if the connection is available, the method can determine if the user device is within a communication range of the landline base station and can transfer the incoming call to a voice message system when the user device is within the communication range.

When transmitting the incoming call to the user device from the wireless network, the method can include providing notifications of the incoming call at the user device and transferring the incoming call to a voice message system when a number of notifications exceeds a predetermined threshold. The method can include determining which one of a plurality of user devices the incoming call is directed to and directing the incoming call to that user device. The routing of the incoming call from the landline network to the wireless network can include obtaining caller identification data and transmitting the incoming call can include presenting the caller identification data to a user of the user device when the user responds to the notifications. The user can be presented an option of accepting the incoming call or forwarding the incoming call to a voice message system.

In one embodiment, a method of integrating landline and wireless communications for multiple user devices associated with a landline network can include receiving an incoming call from the landline network, determining which one of the multiple user devices the incoming call is directed to, determining if a connection is available between the landline network and that user device, routing the incoming call to the user device from the landline network when the connection is available and routing the incoming call from the landline network to the user device via a wireless network when the connection is not available. The method can include determining if a connection is available by determining if the user device is within a communication range of the landline base station. The method can further include providing notifications of the incoming call at the user device and transferring the incoming call to a voice message system when the number of notifications exceeds a predetermined threshold.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
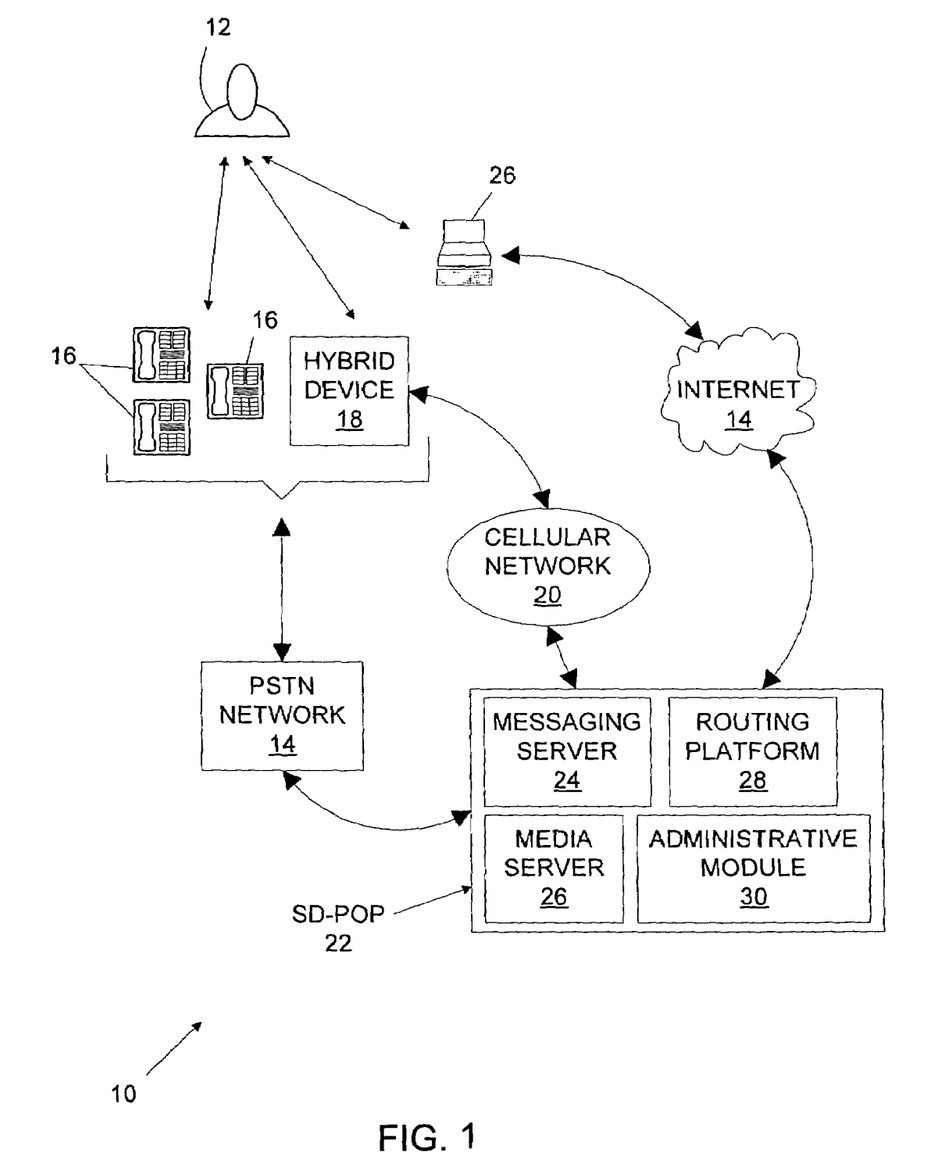
FIG. 1 shows an illustrative system for providing single number phone service.

Referring to FIG. 1, there is shown a system 10 for providing single number service to a user 12. The user 12 can connect to a Public Switched Telephone Network 14 through one or more landline telephone devices 16 and a hybrid device 18. Hybrid device 18 can also connect user 12 to a cellular service phone network 20, as will be described further below. A Service Delivery-Point Of Presence (SD-POP) 22 can provide an interface between the PSTN 14 and the cellular service phone network 20, as may be known in the art. In addition, SD-POP 22 can interface between PSTN 14 and the Internet 24. The user 12 may also connect to the Internet 24 through device 26, e.g., a PC or other microprocessor controlled device having web connectivity, e.g., a cell phone, PDA, or the like.

SD-POP 22 can include messaging server 24, media server 26, routing platform 28 and administrative module 30. For system 10, messaging server 24 can include a unified messaging product as known in the art for supporting mail box services, such as voice, data and fax mail boxes. Media server 26 can include known media servers for managing and/or storing voice media. Routing platform 28 can provide intelligent call routing, as known in the art. For system 10, routing platform 28 can provide call routing based on the predefined rules and policies described herein. Known administrative systems, such as administrative module 30, can manage customer account information and associated rules.

Figure 2:
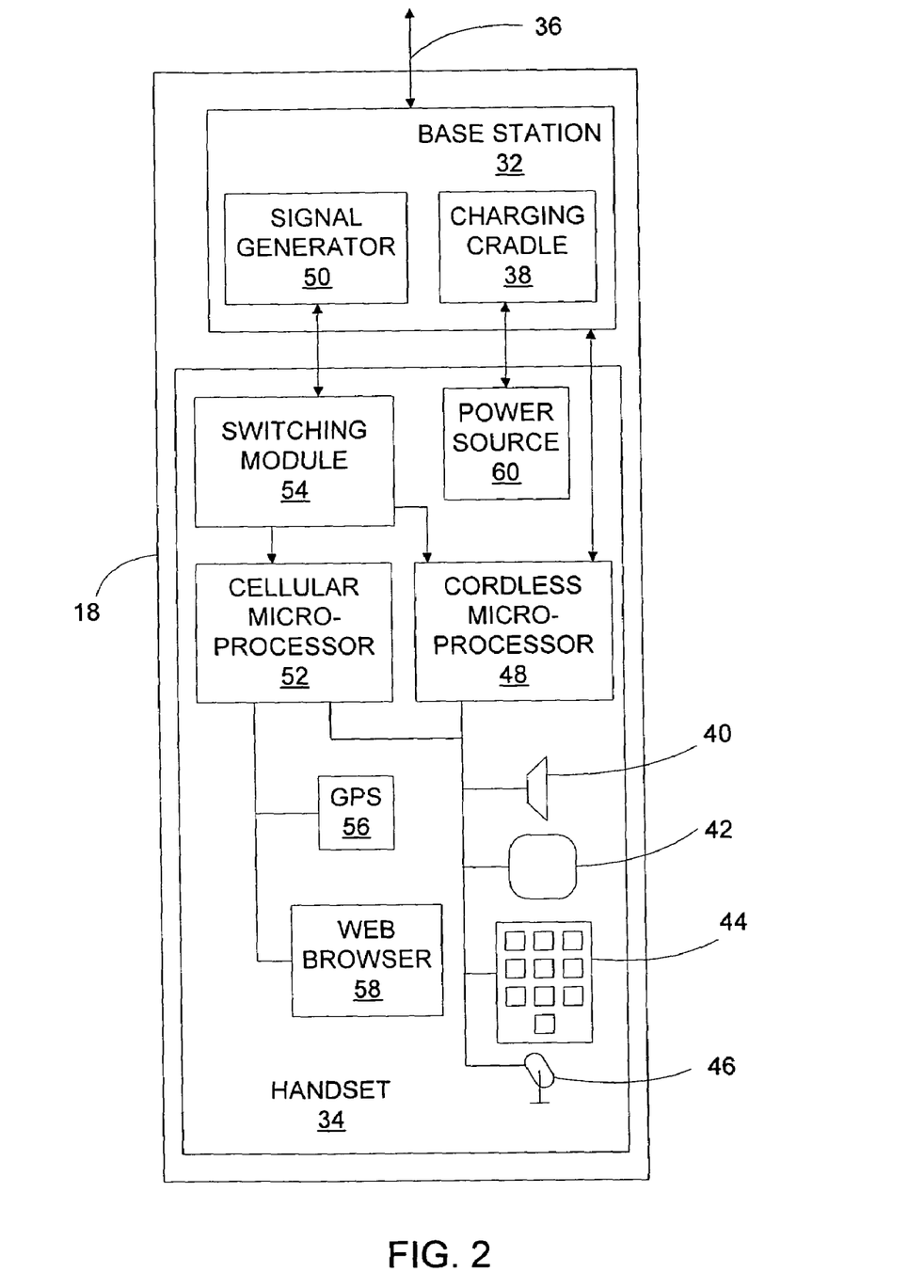
FIG. 2 shows schematic block diagram of a device for use in the system of FIG. 1.

FIG. 2 shows one block diagram of a hybrid device 18. Device 18 can include a landline base station 32 and a handset 34. The landline base station 32 can be configured for operation as a cordless phone landline base station to transmit/receive voice communications to/from handset 34 over a limited range, e.g., less than ½ mile, as is known in the art. Landline base station 32 can include a landline connection 36 for connection to PSTN 14 and charging cradle 38 for holding and recharging handset 34. Additionally, landline base station 32 can include such features as handset paging, message retrieval, message display and other features known in the art for use with cordless phone systems.

Handset 34 can be configured to operate as both a cordless handset and a cellular phone. Handset 34 can include standard features that can be found on known cordless or cellular phones, including a speaker 40, display 42, keypad 44 and microphone 46. For operation as a cordless phone, in conjunction with landline base station 32, handset 34 can include a cordless handset microprocessor unit 48. Microprocessor unit 48 can operate with landline base station 32 using known cordless technology, e.g., 900 MHz spread spectrum technology or 2.4 GHz digital frequency-hopping spread spectrum technology.

As is known for cordless phone operation, landline base station 32 can be in communication with handset 34 to determine if handset 34 is within range of landline base station 32 for operation as a cordless phone. An exchange of signals between signal generator 50 of landline base station 32 and handset 34 can indicate that handset 34 can be in range to operate as a cordless phone. If handset 34 is out of range of landline base station 32 for operation as a cordless phone, no signal can be exchanged. For operation as a cellular phone, handset 34 can include cellular microprocessor unit 52 for operation with one or more known cellular technologies, including for example, 800 MHz analog technology and 800/1900 MHz code division multiple access technology.

In addition, handset 34 can include switching module 54 to provide switching between cordless and cellular operation depending on whether handset 34 is in range of landline base station 32, as described above. Switching module 54 can detect the exchange of signals between landline base station 32 and handset 34, or lack thereof, and can switch between operation of cordless microprocessor unit 48 and cellular microprocessor unit 52, accordingly. Alternatively, switching module 54 can be incorporated in cordless microprocessor unit 48, cellular microprocessor unit 52, or in some combination of the above and landline base station 32 can communicate with handset 34 through switching module 54.

Handset 34 can include optional features as may be known for cordless and/or cellular phones, including GPS tracking module 56 and web browser 58. As known in the art, handset 34 can include a rechargeable power source 60 that can be recharged when handset 34 is placed in charging cradle 38 of landline base station 32. Hybrid device 18 can provide additional functionality as known for cellular and/or cordless phone systems, including personal phone directories, call logs and settings. Such features can be accessible through a "Menu" function, as is known in the art.

Figure 3A:
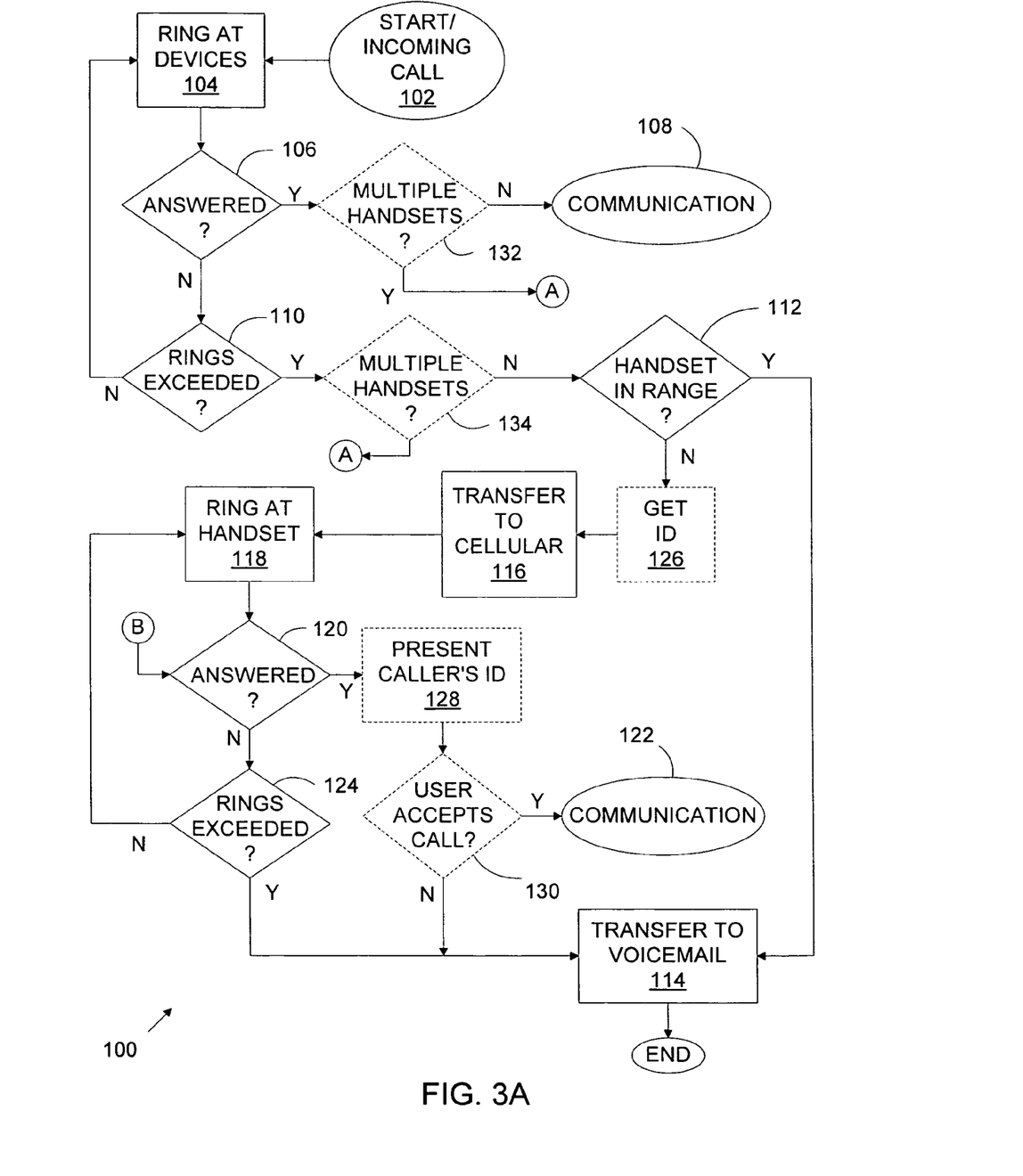
FIG. 3A shows an illustrative incoming call flow diagram for the system of FIG. 1.

Referring now to FIG. 3A, there is illustrated a flow diagram for a method 100 of implementing an incoming call handling portion of the system 10. For incoming calls from PSTN 14, as at 102, the system 10 can ring at the landline devices 16 and the hybrid device 18 (104). When a call is answered, as at 106, communication can start and method 100 can end (108). It is understood that the call can be answered at handset 34 in the cordless operating mode when within range of landline base station 32. If the call is not answered within a predetermined number of rings, as determined at 110, and if handset 34 is within range of landline base station 32, as can be determined at 112, e.g., by the exchange of signals described previously, the incoming call can be transferred (114) to voicemail, as is known in the art. As is known and understood in the art, voicemail service can be provided locally at devices 16 or landline base station 32. Voicemail service can also be provided at PSTN 14, at SD-POP 22, at cellular network 20, through Internet 24, or through one or more of the above.

If handset 34 is not within range of landline base station 32, as determined at 112, e.g., no signals can be exchanged, landline base station 32 can provide an indication to SD-POP 22, e.g., through known Advanced Intelligent Network (AIN) triggers. SD-POP 22 can serve as a transfer device to transfer the call to cellular service phone network 20, as at 116. Handset 34 can receive the call from cellular service phone network via cellular microprocessor unit 52, as at 118. When a call is answered (120) at handset 34, communication can start and method 100 can end (122). Calls transferred to cellular service phone network 20 and not answered after a predetermined number of rings, as determined at 124, can be transferred to voicemail, as previously described at 114.

It can be understood that when transferring the call to cellular service phone network 20, SD-POP 22 can place the call to a cellular network number for handset 34. The cellular network number can be specified by system 10 and can be different from the landline number for user 12, with access to the cellular number restricted to system 10. SD-POP 22 can provide PSTN 14 with a dedicated exchange number with the cellular number embedded therein. When PSTN 14 routes the call to the exchange number, the call can be routed to the cellular number. Methods for transferring calls from landline networks to cellular networks using dedicated exchange numbers with embedded numbers are known in the art, e.g., call forwarding can provide a similar transfer.

Optionally, as indicated in phantom in FIG. 3A, SD-POP 22 can prompt the caller to provide identification (ID) prior to transferring the call to cellular service phone network 20, as at 126. When the call is answered (120), the user 12 can be presented with the caller's ID (128), e.g., a brief recording of their name. The user can then choose (130) to receive, e.g., accept the call (122) or send it directly to voicemail (114).

Figure 3B:
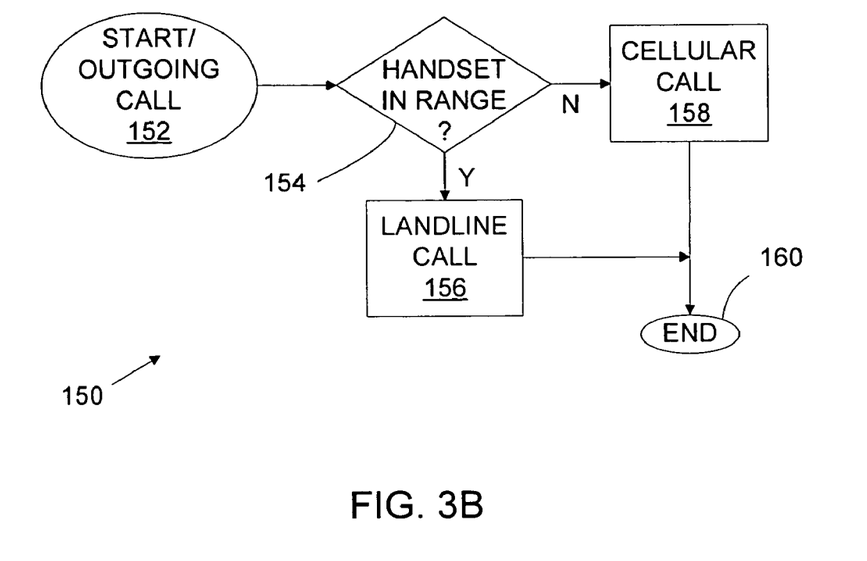
FIG. 3B shows an illustrative outgoing call flow diagram for the system of FIG. 1.

FIG. 3B illustrates a flow diagram for a method 150 of implementing an outgoing call handling portion of the system 10. For placing an outgoing call from handset 34, as at 152, it can be determined if the handset 34 is within range of landline base station 32, as at 154 and as previously described with respect to incoming calls at 112. If signals are exchanged between handset 34 and landline base station 32, switching module 54 can route the outgoing call as a landline call through cordless microprocessor unit 48 and landline base station 32, as indicated at 156. If signals cannot be exchanged, handset 34 can be out of range of landline base station 32, and switching module 54 can route the outgoing call as a cellular call through cellular microprocessor unit 52, as indicated at 158. The outgoing cellular call can be associated with the cellular network number described with respect to incoming calls. The method 100 can end (160) when the landline or cellular call is placed.

In one embodiment, there can be multiple users of system 10, with multiple hybrid devices 18, e.g., in a household environment, or a small business environment. For this embodiment, one local landline can be provisioned. However, a separate cellular service can be provisioned for each of the hybrid devices 18. It is anticipated that each hybrid device can be associated with one of the users, though users can share a hybrid device 18, or one user can have multiple hybrid devices 18.

Figure 4:
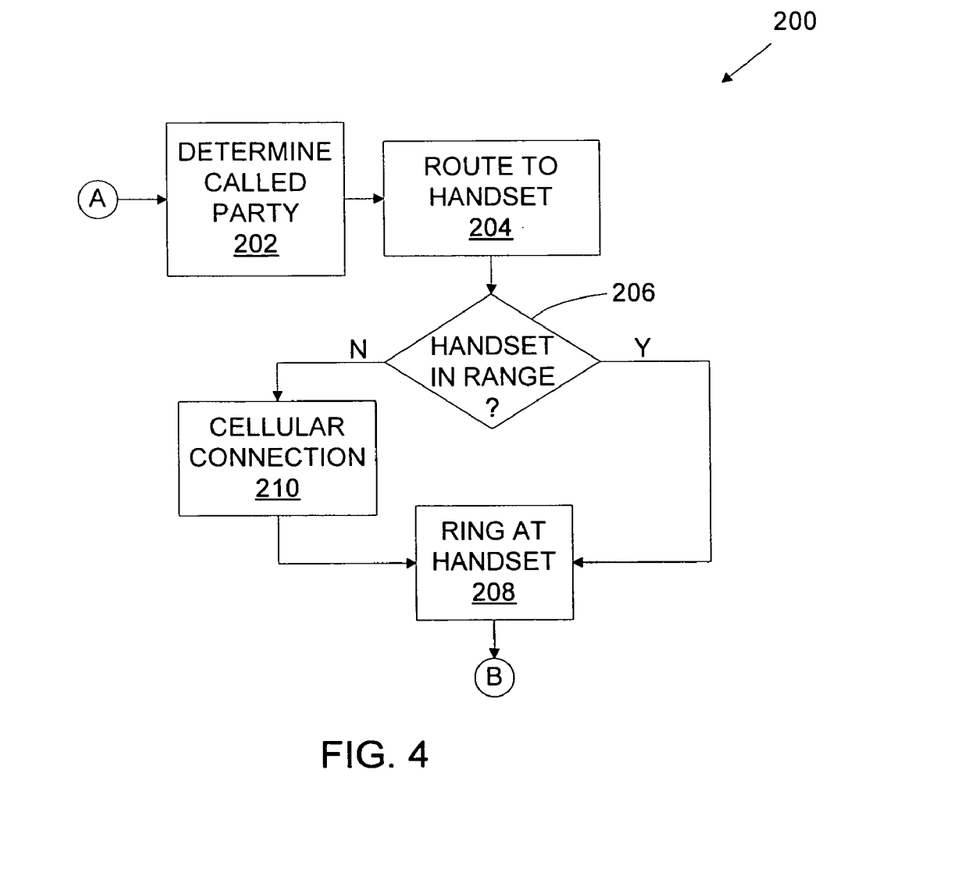
FIG. 4 shows an illustrative method of transferring a call to a selected device of the system of FIG. 1.

FIG. 4 illustrates a method 200 that can operate within method 100 to route an incoming call to the proper party, when system 10 includes multiple hybrid devices 18. With reference to FIG. 3A, branch points 132 and 134 are shown in phantom to illustrate the connection between a method 100 according to FIG. 3A and a method 200 according to FIG. 4. When an incoming call on landline devices 16, or on hybrid devices 18 is answered (106 in FIG. 3A), or if the predetermined number of rings is exceeded (110 in FIG. 3A), the method 100 can branch, as indicated at "A" in FIGS. 3A and 4, to a method 200 according to FIG. 4 when the system 10 includes multiple handsets, as determined in FIG. 3A at 132 and/or 134, respectively.

The identification of the called party can be determined (202) by the answering party in the case of 132, or by SD-POP 22 in the case of 134, by prompting the caller to identify the called party. The SD-POP 22 can employ known methods for prompting the caller to identify the called party, including having the caller identify the called party by saying the name, by choosing the called party from a listing provided by the SD-POP 22, by providing an extension for the called party, or by other known input means. Once the called party is identified, the call can be routed to the handset 34 associated with the identified called party, as at 204.

If the identified handset 34 is within range of its landline base station 32, as determined at 206, the landline connection 36 can be maintained and the identified handset 34 can ring, as at 208. If the identified handset 34 is not within range of its landline base station 32, an indication can be provided to SD-POP 22, as described previously with relation to FIG. 3A, and a cellular connection can be made (210) to the cellular service for the particular handset 34 identified at 202 in order to ring the identified handset at 208. The method 200 of FIG. 4 can then continue with method 100 of FIG. 3A, as indicated at "B" in FIGS. 3A and 4, to determine if the call is answered, as at 120 of FIG. 3A.

It can be understood that transferring to a handset at 204 by an answering party can include known methods of transferring calls, including placing the call on hold and providing an extension, or depressing an extension key or button. Providing the extension or depressing of the key or button can provide the called party information to SD-POP 22.

The systems and methods described herein can enable delivery of an integrated telephony service that can provide users with a single phone number and a single handset for use at a stationary location, such as a home or office, and also for use while away from the stationary location. The users can have one number for their landline communications to/from the stationary location and for their mobile communications. The systems and methods can also provide for a single voice mailbox for the users' messages through messaging server 24 of SD-POP 22. By integrating landline and cellular calls through a single handset, billing for the service can be simplified, allowing the user to receive a single bill for the integrated service.

In addition to the above features, the systems and methods described herein can include providing a user with a single phone number that can be maintained by the user when changing residences. Calls can be forwarded to SD-POP 22 using known call forwarding techniques and SD-POP 22 can transfer calls based on user-defined call treatment preferences to either their new local line and/or cellular service. Further, for outgoing calls, switching module 54 can be configured to place the call through the network providing better service quality, or more economical service, or some combination of factors determined by the user. For example, the cellular service can provide free long distance calls and user 12 can have switching module 54 place all outgoing long distance calls through the cellular service.

Additionally, the systems and methods can be integrated with known Internet call managing services, as indicated by device 26 and Internet 14 in FIG. 1. When online, users can be notified that a landline call is incoming and can have the option of transferring the call to the cellular service. Also, such call managing services can provide access to voicemail messages.

The systems and implementations thereof described herein may not be limited to particular hardware configurations. For example, the landline base station 32 of hybrid device 18 can include a keypad, speaker, microphone, display and other such components, as are known in the art. Additionally, the systems and methods can find use in a variety of phone network environments, including the home and small office environments previously described. For example, the methods and systems described herein can be applicable to paging networks in addition to, or alternatively to, the cellular network 20. For this embodiment, the handset 34 can include a pager.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A system for integrating a landline communications network and a wireless communications network comprising:
   a plurality of hybrid devices for enabling telephony communications;
   a landline connection path between said landline communications network and said hybrid devices;
   a wireless connection path between said wireless communications network and said hybrid devices;
   an availability unit for determining if said landline connection path is available to said hybrid devices;
   a switch to select one of said landline connection path and said wireless connection path for operation of one of said hybrid devices, wherein said wireless connection path is selected at least when said landline connection path is unavailable, said switch further selecting one of said wireless connection path and said landline connection path for an outgoing call based on at least one predetermined performance factor when said wireless connection path and said landline connection path are available; and
   a transfer device connected to the landline communications network to transfer one of said telephony communications enabled by said hybrid devices from said landline communications network to said wireless communications network when said switch selects said wireless connection path.

2. The system of claim 1, wherein said hybrid devices comprises:
   a handset providing a user interface for the hybrid device;
   a landline base station connected in said landline connection path between said landline communications network and said handset, the landline base station routing said telephony communications between said landline communications network and said handset;
   a cordless microprocessor unit connected in said landline connection path between said landline base station and said handset for receiving and transmitting said telephony communications between said handset and said landline base station; and
   a wireless microprocessor unit connected in said wireless connection path between said handset and said wireless communications network for receiving and transmitting said telephony communications between said handset and said wireless communications network.

3. The system of claim 2, wherein said landline base station comprises a charging station for charging a power source for said handset.

4. The system of claim 3, wherein said transfer device comprises:
   a messaging center supporting mail box services for users of the system;
   a media server managing and storing voice media;
   a routing platform providing intelligent routing of said telephony communications based on predefined rules and policies; and
   an administrative module managing customer account information for said users.

5. The system of claim 3, wherein said handset comprises at least one of a speaker, a display, a keypad and a microphone.

6. The system of claim 5, wherein said handset comprises at least one of a global positioning system tracking module and a web browser.

7. The system of claim 3, wherein said handset comprises a pager.

8. The system of claim 2, wherein said cordless connection microprocessor unit is a 900 MHz cordless microprocessor unit.

9. The system of claim 1, wherein said transfer device comprises:
a messaging center supporting mail box services for users of the system;
a media server managing and storing voice media;
a routing platform providing intelligent routing of said telephony communications based on predefined rules and policies; and
an administrative module managing customer account information for said users.

10. The system of claim 1, wherein:
said landline connection path is integrated with an Internet call managing service; and
said switch is activated by a user of said Internet call managing service.

11. A hybrid device for integrating landline communications and wireless communications, comprising:
at least two handsets;
a landline microprocessor unit selectively connected between one of said handsets and a landline network;
a wireless microprocessor unit selectively connected between said one of said handsets and a wireless network; and
a switching module to selectively activate one of said landline microprocessor unit and said wireless microprocessor unit, wherein said switching module activates said wireless processor unit at least when said landline microprocessor is unable to connect to said one of said handsets, said switching module further selecting one of said wireless microprocessor unit and said landline microprocessor unit for an outgoing call from said one of said handsets based on at least one predetermined performance factor when both are available.

12. The hybrid device of claim 11, comprising a landline base station connected between said landline network and said landline microprocessor unit and facilitating cordless communications between said landline network and said landline microprocessor unit.

13. The hybrid device of claim 12, wherein said landline base station comprises a charging station for recharging a power source for at least one of said handsets.

14. The hybrid device of claim 12, comprising a 900 MHz cordless connection between said landline base station and said handsets.

15. The hybrid device of claim 11, wherein said handsets comprise at least one of a speaker, a display, a keypad and a microphone.

16. The hybrid device of claim 15, wherein said handsets comprise at least one of a global positioning system tracking module and a web browser.

17. The hybrid device of claim 11, wherein said handsets comprise a pager.

18. A method of integrating landline communications and wireless communications, comprising:
receiving an incoming call from a landline network;
determining if a connection is available between said landline network and at least two user devices, wherein said at least two user devices are capable of connecting with said landline network and a wireless network;
determining if a connection path is available between said wireless network and said at least two user devices;
routing said incoming call from said landline network to a wireless network when said connection between said landline network and said user devices is not available and when said incoming call is not answered, and
routing an outgoing call to one of said wireless network and said landline network based on at least one predetermined performance factor when said wireless network and said landline network are available; and
transmitting said incoming call to said user devices from said wireless network.

19. The method of claim 18, comprising:
initiating an outgoing call from one of said user devices;
determining if said connection is available between said landline network and said one of said user devices;
routing said outgoing call from said one of said user devices to said landline network when said connection is available; and
routing said outgoing call from said user device to said wireless network when said connection between said landline network and said user device is not available.

20. The method of claim 18, wherein receiving an incoming call comprises:
providing notifications of said incoming call at a landline base station connected to said landline network; and
proceeding to determining if said connection is available when a number of said notifications exceeds a predetermined threshold.

21. The method of claim 20, wherein determining if said connection is available comprises:
determining if at least one of said user devices is within a communication range of said landline base station; and
transferring said incoming call to a voice message system when none of said user devices are within said communication range.

22. The method of claim 18, wherein transmitting said incoming call comprises:
providing notifications of said incoming call at said user devices; and
transferring said incoming call to a voice message system when a number of said notifications exceeds a predetermined threshold.

23. The method of claim 18, comprising:
determining which one of said user devices said incoming call is directed to; and
directing said incoming call to said one of said user devices.

24. The method of claim 18, wherein:
routing said incoming call from said landline network to a wireless network comprises obtaining caller identification; and
transmitting said incoming call comprises presenting said caller identification to a user of one of said user devices when said user answers said incoming call.

25. The method of claim 24, wherein presenting said caller information comprises providing an option for said user to choose one of accepting said incoming call and forwarding said incoming call to a voice message system.

26. A method of integrating landline communications and wireless communications for multiple user devices associated with a landline network and a wireless network, comprising:
receiving an incoming call from said landline network;
determining which one of said multiple user devices said incoming call is directed to;
determining if a landline connection is available between said landline network and said one of said multiple user devices said incoming call is directed to;

determining if a wireless connection is available between said wireless network and said one of said multiple user devices said incoming call is directed to;

routing said incoming call to said one of said multiple user devices from said landline network or said wireless network when said landline connection and said wireless connection are available, wherein said user device is capable of connecting with said landline network and said wireless network; and routing said incoming call from said landline network to said one of said multiple user devices via said wireless connection when said landline connection is not available.

27. The method of claim 26, wherein determining if said landline connection is available comprises determining if said one of said multiple user devices said incoming call is directed to is within a communication range of a landline base station.

28. The method of claim 27, comprising:

providing notifications of said incoming call at said one of said multiple user devices; and transferring said incoming call to a voice message system when a number of said notifications exceeds a predetermined threshold.

\* \* \* \* \*